No. 795,988. PATENTED AUG. 1, 1905.
W. C. KYLE.
HAY STACKER.
APPLICATION FILED JUNE 25, 1904.
3 SHEETS—SHEET 1.
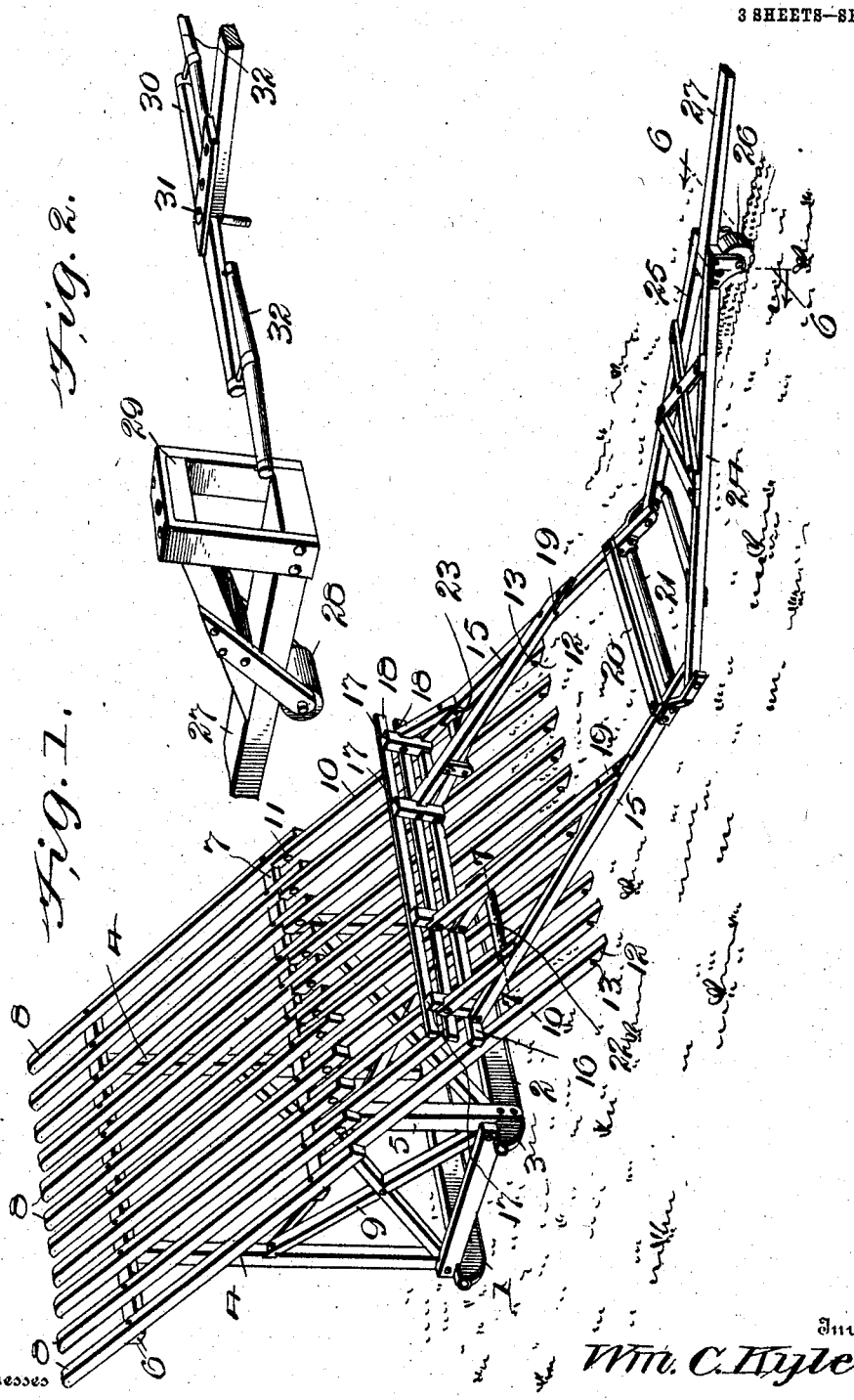

No. 795,988. PATENTED AUG. 1, 1905.
W. C. KYLE.
HAY STACKER.
APPLICATION FILED JUNE 25, 1904.
3 SHEETS—SHEET 2.
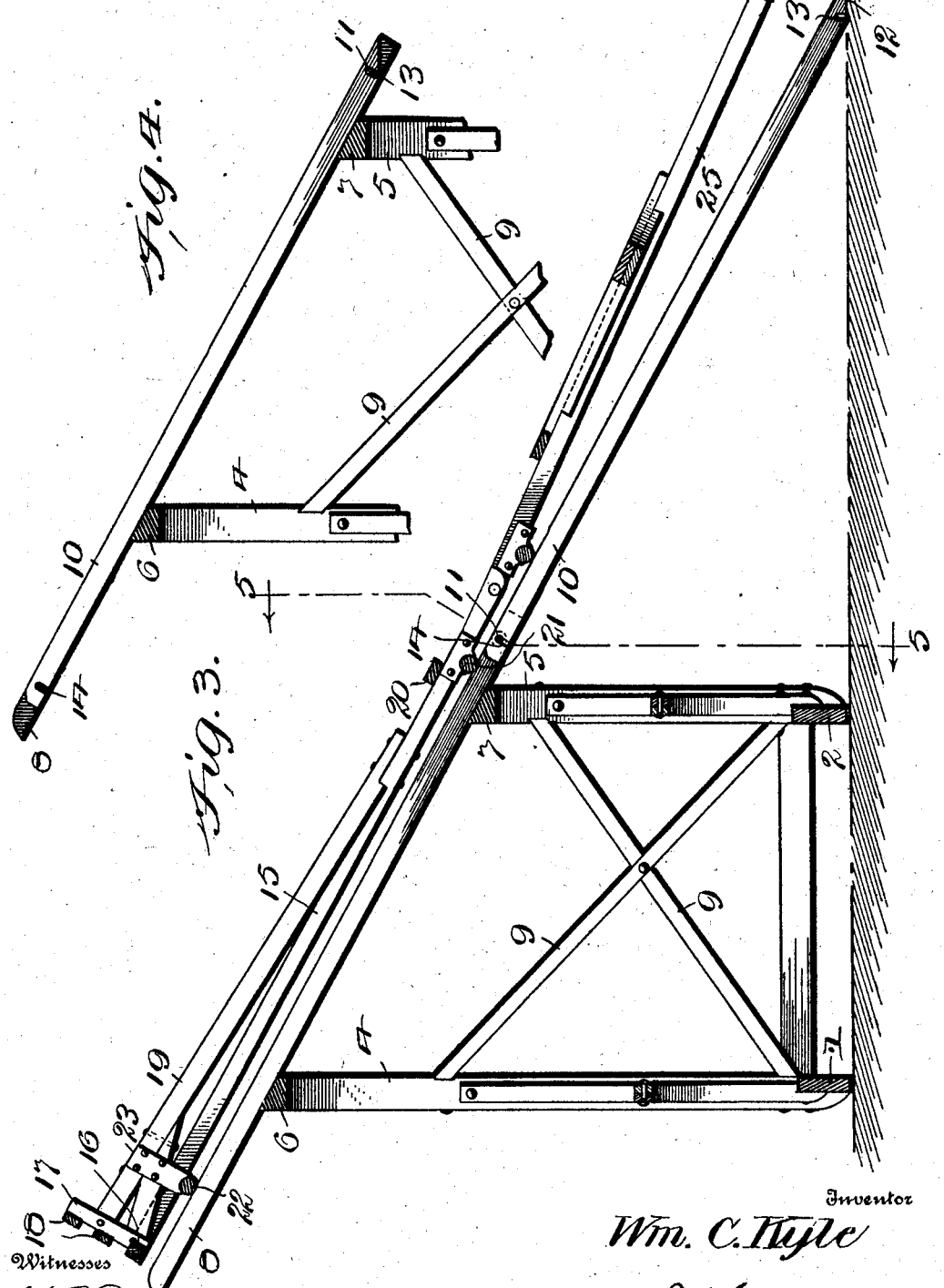
Witnesses
F. C. Barry
S. W. Fitzgerald
Inventor
Wm. C. Kyle
By W. F. Fitzgerald
Attorneys No. 795,988. PATENTED AUG. 1, 1905.
W. C. KYLE.
HAY STACKER.
APPLICATION FILED JUNE 25, 1904.
3 SHEETS—SHEET 3.
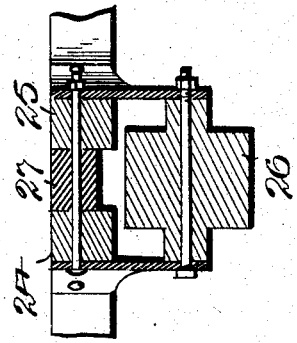
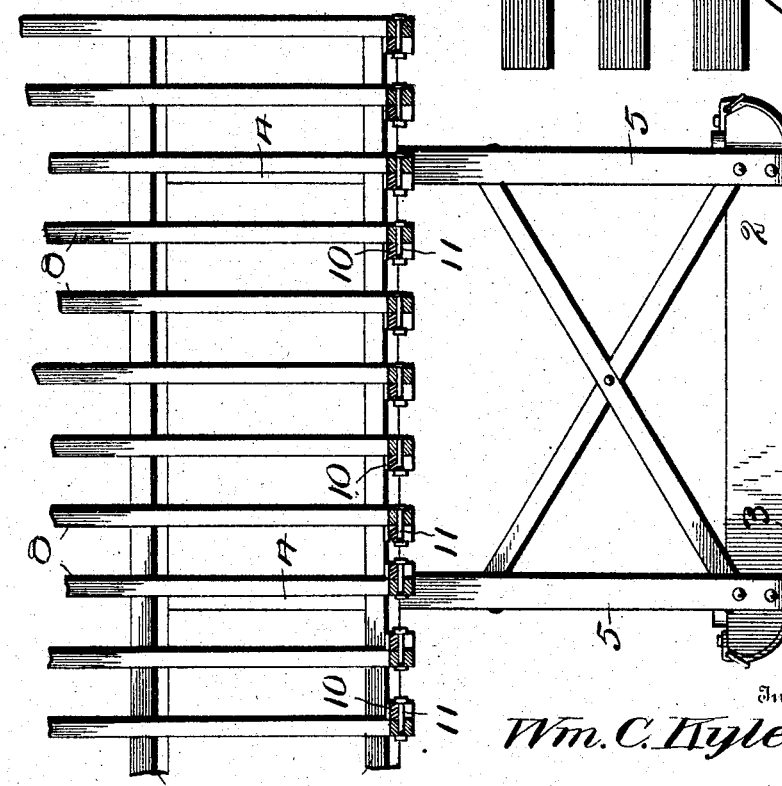
Witnesses
F. C. Barry.
S. W. Fitzgerald.
Inventor
Wm. C. Kyle
By W. J. Fitzgerald
Attorneys

UNITED STATES PATENT OFFICE.

WILLIAM C. KYLE, OF POCAHONTAS, ILLINOIS.

HAY-STACKER.

No. 795,988.　　　　　Specification of Letters Patent.　　　　　Patented Aug. 1, 1905.

Application filed June 25, 1904. Serial No. 214,160.

*To all whom it may concern:*

Be it known that I, WILLIAM C. KYLE, a citizen of the United States, residing at Pocahontas, in the county of Bond and State of Illinois, have invented certain new and useful Improvements in Hay-Stackers; and I do hereby declare the following to be a full, clear, and exact description of the invention, such as will enable others skilled in the art to which it appertains to make and use the same.

My invention relates to hay-stackers, and more particularly to an appliance for delivering the hay in quantities direct from the field to a point at the top of the rick or stack, whereby the hay may be received by the stacker and properly placed in position so that the hay may be safely disposed away for future use; and my invention consists of certain novel features of combination and construction of parts, the preferred form whereof will be hereinafter clearly set forth, and pointed out in the claim.

The main object of my invention is to provide a portable appliance of the character specified which may be easily moved from place to place, as from one part of a field to another or from one meadow to another similar field, and may be conveniently folded and stored within a comparatively small amount of space when not required for use.

Other objects and advantages will be hereinafter made clearly apparent, reference being had to the accompanying drawings, which are made a part of this application, and in which—

Figure 1 shows a perspective view of my invention complete ready for use. Fig. 2 is a detail view showing preferred means of connecting the draft-animals to my hay-delivering attachment. Fig. 3 is a side elevation, partly in section, of my invention complete ready for use and with the hay-pushing appliance lifted to the highest point. Fig. 4 is a detail view showing part of the framework in section and also showing one way of disposing the inclined guiding members when not in use. Fig. 5 is a sectional view of Fig. 3 on line 5 5. Fig. 6 is a detail showing a sectional view of Fig. 1 on line 6 6. Fig. 7 is a detail view, partly in section, showing a portion of the framework of the hay-pushing appliance and the carrying-roller therefor as seen from the dotted line 7 7 on Fig. 1.

For convenience of reference to the various details of my invention and coöperating accessories numerals will be employed, the same numeral applying to a similar part throughout the several views.

Referring to the numerals on the drawings, 1 and 2 designate the supporting-sills, preferably made in the form of runners properly beveled at each end, so that the same may be drawn in either direction, and also properly reinforced upon their lower edges with an antiwearing plate or bar 3, as will be clearly observed in the several views of the drawings. Upon the runners thus or otherwise constructed I erect the framework of my machine, consisting of two or more uprights 4, erected upon the runner 1, and two or more relatively shorter uprights 5, erected upon the runner 2, said standards 4 having the cross-beam 6 at their upper ends, while the standards 5 have the cross-beam 7, corresponding in length with the cross-beam 6, but of much less height. Upon the cross-beam 6 and 7 I secure a plurality of inclined members 8, the degree of inclination of said members being of course determined by the relative position of the cross-beams 6 and 7, it being understood that the uprights 4 and 5 are properly reinforced and strengthened by suitable bracing-sections 9, arranged in any preferred way. The lower ends of the members 8 reach slightly below the cross-beam 7, and their length of reach is supplemented by the auxiliary inclined members 10, there being a plurality of said members, corresponding in number to the members 8, and the upper ends of the members 10 may be pivotally connected in any preferred way to the lower ends of said members 8, as by the bolts 11 or equivalent thereof. The lower ends of the members 10 are beveled, so that they will rest squarely upon the ground, said beveled ends being designated by the numeral 12, and near the lower and upper ends of each of the members 10 I also provide the recesses 13 and 14, respectively, whereby when the members are not in use they may be lifted off of the bolts 11 and placed alongside of the members 8, the recess 13 receiving the bolt 11. In some instances, however, the upper ends of the members 10 may be provided with an aperture to receive the bolt or lug 11, in which case the lower ends of the members 10 may be swung upward, so that said members will rest parallel and alongside of the members 8, and thus be disposed out of the way and held against casual displacement until it is again desired that the members 10 shall be lowered into their operative positions. It will thus be seen that I have provided an inclined way or chute leading up to the desired height, as to the top of the stack or rick to be formed or to an opening in the gable of a hay-barn, and it is up said inclined way that I deliver the hay to be ricked or mowed away, which delivery I accomplish by what I term the "pushing" appliance, consisting in this instance of a suitable framework comprising the side bars 15, connected together at their upper ends by a cross-bar 16, and to said cross-bar I provide a plurality of uprights 17, to which are secured a plurality of supplementary cross-bars 18, there being any preferred number of said cross-bars deemed necessary to carry a requisite load of hay, straw, or the like. I also provide the auxiliary bracing-bars 19 to give rigidity and strength to the framework of the pusher. The lower or outer ends of the pushing-bars 15 are connected together by the cross-bar 20, and mounted below said cross-bar is the antifriction or carrying roller 21, while at the upper end of the framework I also operatively mount in suitable bearings the supplementary rollers 22 and 23, or a single roller may be properly secured in place, if preferred, and it therefore follows that the pusher-frame and the load carried thereby may be easily moved up the inclined chute at the expense of a minimum amount of friction, inasmuch as said rollers will sustain the entire load and freely turn in the performance of their office.

To the lower ends of the bars 15 I pivotally connect a framework consisting of the pushing-bars 24 and 25, which are brought near together at their outer ends and pivotally connected with the carrying-truck 26, to which latter I attach the guiding-tongue 27, said tongue being secured in connection with the truck in any preferred way. To the outer end of the tongue 27 I provide an antifriction-roller 28, disposed upon the under side thereof. I also secure to the outer end of the tongue 27 an upwardly-extending bracket or doubletree-seat 29, to which the doubletree 30 is secured, as with the king-bolt 31, it being understood that said doubletree is provided with swingletrees 32, to which the draft-animals may be attached and by means of which the pusher with the load thereon is forced up the inclined chute or framework hereinbefore described.

From the foregoing description it will be observed that the inclined guideway, comprising the members 8 and 10 and the supporting-framework therefor, may be drawn to any desired point in the field when the hay is to be ricked or contiguous to the open gable of a hay-barn when the hay is to be placed in the mow. The hay to be elevated is then deposited in any desired manner at the bottom of the inclined way, when the pusher, actuated by the force of the team of horses or the like, may be caused to act upon the hay thus deposited and cause the same to be forced up the inclined way and forced off of the upper end thereof, the hay, straw, or the like thus delivered being in position to be received by the stacker and deposited in proper position upon the rick or in the mow.

The various parts of my invention may be cheaply and expeditiously manufactured and readily assembled each in its respective operative position, and while I have described the preferred combination and construction of parts I desire to comprehend in this application all substantial equivalents and substitutes which may be considered as fairly falling within the scope of my invention.

It is thought from the foregoing description that the construction and manner of using my invention have thus been made clearly apparent, though it may be stated that the operation thereof is as follows: After the inclined guideway has been located at the proper point where the rick is to be builded the hay or the like is deposited as with any kind of hay-raking appliance at the bottom of said inclined way and a team of horses is hitched to the swingletrees, so that they will stand facing the inclined way and the pusher. The team is then forced to travel toward the inclined way, which drives the pusher-head with its accompanying load, forcing said load up the inclined way to the extreme highest point thereof, when the load will fall off of the upper end of the inclined way into proper position to be received and disposed of by the stackers employed to properly dispose the hay, &c., at proper parts of the rick, so that the latter will be builded up uniformly and in a manner to insure that the latter will be protected from rain when the rick is completed.

What I claim as new, and desire to secure by Letters Patent, is—

The herein-described ricking appliance comprising a framework mounted upon carrying-runners, a plurality of inclined bars secured to said frame and disposed at right angles to the longitudinal plane of said runners, a plurality of auxiliary inclined members pivotally secured to the lower ends of said inclined bars whereby a continuous guideway reaching from the ground to the highest point desired will be provided, a bolt 11 projecting from the lower end of each of said inclined bars and adapted to be engaged by the slot 14 in the auxiliary members when the ricker is in use and by the slot 13 when the ricker is being moved, in combination with a hay pushing or carrying appliance adapted to ride up said inclined way, substantially as and for the purpose set forth.

In testimony whereof I have signed my name to this specification in the presence of two subscribing witnesses.

WILLIAM C. KYLE.

Witnesses:
 WM. T. EASLEY,
 D. R. WILKINS.